United States Patent
Song et al.

(10) Patent No.: US 8,508,693 B2
(45) Date of Patent: Aug. 13, 2013

(54) BACKLIGHT UNIT AND LIQUID CRYSTAL DISPLAY DEVICE HAVING THE SAME

(75) Inventors: Young Ki Song, Paju-si (KR); Jun Hyung Kim, Mokpo-si (KR)

(73) Assignee: LG Display Co., Ltd., Seoul (KR)

( * ) Notice: Subject to any disclaimer, the term of this patent is extended or adjusted under 35 U.S.C. 154(b) by 238 days.

(21) Appl. No.: 12/948,565

(22) Filed: Nov. 17, 2010

(65) Prior Publication Data

US 2011/0134369 A1  Jun. 9, 2011

(30) Foreign Application Priority Data

Dec. 8, 2009  (KR) .................. 10-2009-0121459

(51) Int. Cl.
*G02F 1/1335* (2006.01)
*F21V 7/04* (2006.01)

(52) U.S. Cl.
USPC ............... 349/65; 362/621; 362/628; 349/62

(58) Field of Classification Search
USPC ................ 349/62, 65; 362/621, 628
See application file for complete search history.

(56) References Cited

U.S. PATENT DOCUMENTS

| 8,070,346 B2 * | 12/2011 | Maeda et al. ............... 362/627 |
| 2006/0146574 A1 | 7/2006 | Fu et al. |
| 2009/0129058 A1 * | 5/2009 | Tokita et al. ............... 362/97.2 |

FOREIGN PATENT DOCUMENTS

| CN | 201170498 Y | 4/2006 |
| CN | 1841183 A | 10/2006 |
| CN | 1882802 A | 12/2006 |
| CN | 201170498 Y | 12/2008 |
| CN | 101358712 A | 2/2009 |
| CN | 101487569 | 7/2009 |
| JP | 9-81048 A | 3/1997 |
| JP | 9-330610 A | 12/1997 |
| JP | 11-149073 A | 6/1999 |
| JP | 2003-35824 A | 2/2003 |
| JP | 2007-103354 A | 4/2007 |
| JP | 4138276 B2 | 8/2008 |
| TW | 575722 B | 2/2004 |

* cited by examiner

*Primary Examiner* — Nathanael R Briggs
(74) *Attorney, Agent, or Firm* — McKenna Long & Aldridge, LLP

(57) ABSTRACT

Disclosed is a backlight unit provided with an improved external appearance and uniform brightness is disclosed. The backlight unit includes a light source, and a light guide plate configured to primarily and secondarily reflect light from the light source and to convert the reflected light into two dimensional light. One side portion of the light guide plate is formed to provide an undercut space enough to accommodate the light source.

14 Claims, 3 Drawing Sheets

BACKLIGHT UNIT AND LIQUID CRYSTAL DISPLAY DEVICE HAVING THE SAME

CROSS-REFERENCE TO RELATED APPLICATION

This application claims priority under 35 U.S.C. 119 to Korean Patent Application No. 10-2009-0121459, filed on Dec. 8, 2009, which is hereby incorporated by reference in its entirety.

BACKGROUND

1. Field of the Disclosure

This disclosure relates to a backlight unit, and more particularly to a backlight unit adapted to provide an improved external appearance and uniform brightness, as well as a liquid crystal display (LCD) device with the same.

2. Description of the Related Art

Cathode ray tubes (CRTs) correspond to one of display devices which are widely used. The CRTs are mainly used as monitors for TVs, measuring apparatuses, information terminals, and so on. However, the heavy weight and large size of the CRTs have been a major hindrance to the manufacturing of small, light electronic products.

In other words, the CRTs have the limitations of weight and size in the current trend of small, light electronic products. Under such circumstances, LCD devices using an electro-optical effect, plasma display panels (PDPs) using a gas discharge, electro luminescence display (ELD) devices using a electro-luminescent effect, and so on are expected to substitute for the CRTs.

Among the substitutable display devices, LCD devices are being actively researched. Also, LCD devices are gradually being used in a wide range of applications due to their advantages such as lightness, thinness, and low power consumption. Moreover, LCD devices are being manufactured to have even larger screens, be thinner, and consume less power, in order to meet the requirements of users. Such LCD devices display images by controlling the amount of light transmitted through liquid crystal.

The LCD devices are not self-illuminating display devices, unlike CRTs. As such, an LCD device includes a backlight unit provided on the rear surface of an LCD panel. The backlight unit includes a separated light source providing the light necessary to display an image. The backlight unit can be classified as either an edge type or a direct type in accordance with the disposition of a light source.

Such an edge type backlight unit is mainly applied to comparatively small-sized LCD devices such as the monitors of laptops and desk-top computers. The edge type backlight unit has good light uniformity, a lengthened lifespan, and the advantage of making the LCD device thinner.

The direct type backlight unit has begun to be concentrically developed as the LCD device is enlarged to a size above 20 inches. The direct type backlight unit forces light to be directly irradiated onto the entire surface of the LCD panel. To this end, the direct type backlight unit includes a plurality of light sources arranged on the lower surface of a diffusion plate. Since the direct type backlight unit has a higher light efficiency than the edge type backlight unit, it is mainly used for LCD devices of a large size that require a high brightness.

The backlight unit employs a plasma type light source, such as a cold cathode fluorescent lamp (CCFL), a hot cathode fluorescent lamp (HCFL), an external electrode fluorescent lamp (EEFL), an external and internal electrode fluorescent lamp (EIFL), or others, as a light source. Alternatively, the backlight unit uses a light emission diode (LED) as a light source. Particularly, the LED is widely used in the backlight unit because of its features of long lifespan, low power consumption, small size, superior durability, and others.

The LEDs included in the edge type backlight unit are used as a spotted light source. As such, each of the LEDs must have a limited emission angle. Due to this, the edge type backlight unit configured to include the LEDs has a disadvantage causing a brightness difference between regions in which the LED is disposed and not. The brightness difference results from the fact that a lightened portion and a darkened portion are generated on the regions in which the LED is disposed and not, respectively.

Also, the edge type backlight unit must be provided with a critical side space necessary to receive the LEDs. Moreover, the edge type backlight unit must dispose the LEDs to be separate from a light guide plate by a fixed distance. Therefore, it is very difficult to reduce a non-display area corresponding to an edge area of the LCD device without a display area occupying a central portion, below a critical size.

BRIEF SUMMARY

Accordingly, the present embodiments are directed to an LCD device that substantially obviates one or more of problems due to the limitations and disadvantages of the related art.

An object of the present embodiment is to provide a backlight unit that is adapted to provide an improved external appearance and uniform brightness, and an LCD device with the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes a light source, and a light guide plate configured to primarily and secondarily reflect light from the light source and to convert the reflected light into two dimensional light. One side portion of the light guide plate is formed to provide an undercut space enough to accommodate the light source.

An LCD device according to another aspect of the present embodiment includes a liquid crystal display panel, a light source disposed by one under side of the liquid crystal display panel, and a light guide plate configured to primarily and secondarily reflect light from the light source and to convert the reflected light into two dimensional light. One side portion of the light guide plate is formed to provide an undercut space enough to accommodate the light source.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
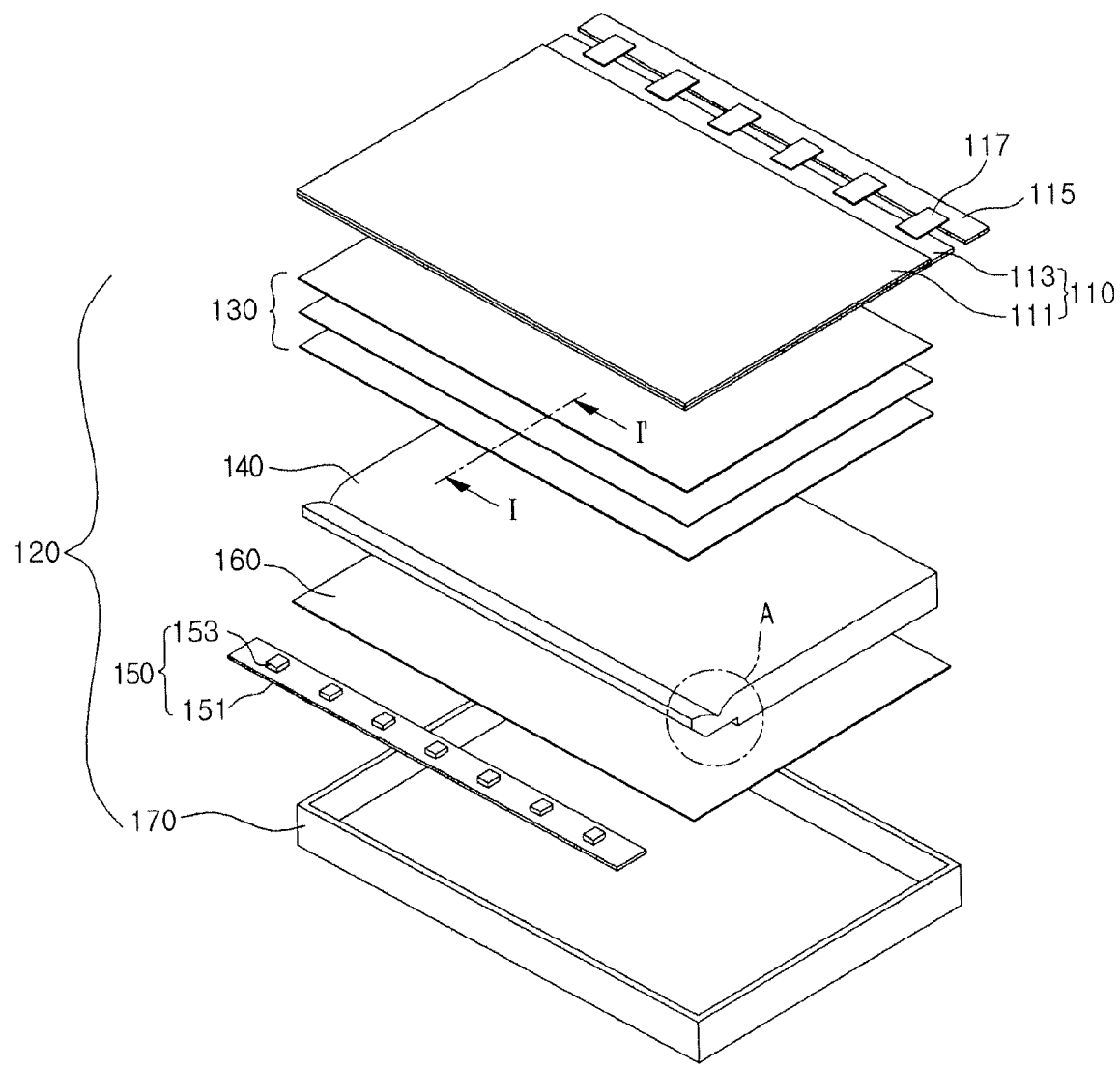
FIG. 1 is a disassembled perspective view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
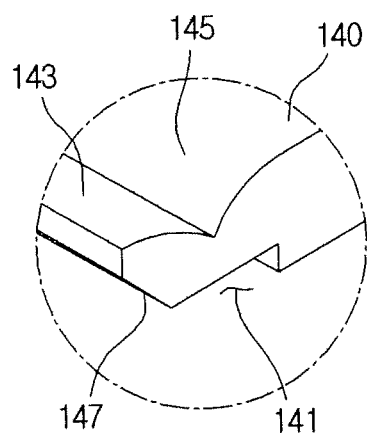
FIG. 2 is a perspective view largely showing a part "A" of the light guide plate in FIG. 1.
Figure 3:
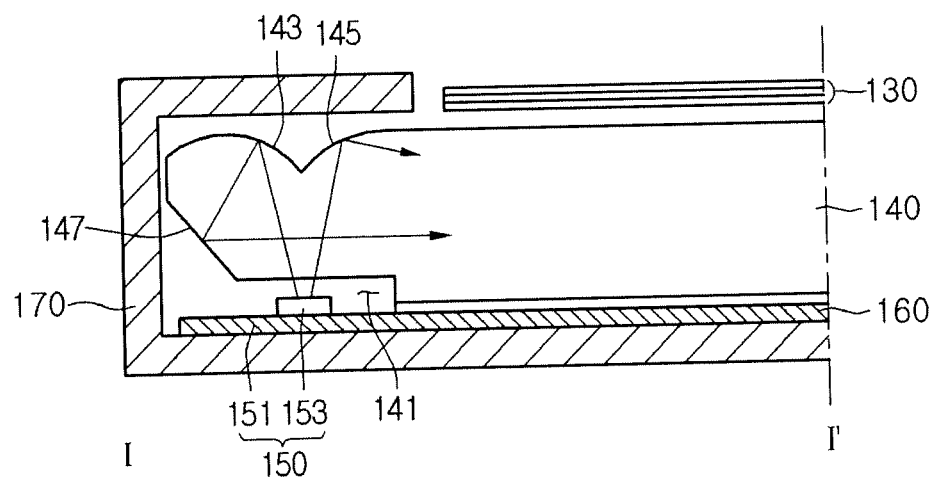
FIG. 3 is a cross-sectional view showing the backlight unit taken along a line I-I' in FIG. 1.

FIG. 1 is a disassembled perspective view showing an LCD device according to an embodiment of the present disclosure. FIG. 2 is a perspective view largely showing a part "A" of the light guide plate in FIG. 1. FIG. 3 is a cross-sectional view showing a backlight unit taken along a line I-I' in FIG. 1.

Referring to FIGS. 1 through 3, an LCD device according to an embodiment of the present disclosure includes an LCD panel 110 configured to display images, and a backlight unit 120 disposed under the LCD panel 110. The backlight unit 120 applies light to the LCD panel 110.

The LCD panel 110 includes a color filter substrate 111 and a thin film transistor substrate 113 disposed opposite each other and combined to maintain a uniform cell gap between them. The LCD panel 110 further includes a liquid crystal layer (not shown) interposed between the two substrates.

Although they are not shown in detail in the drawings, the color filter substrate 111 and the thin film transistor substrate 113 will now be described in detail. The thin film transistor substrate 113 includes a plurality of gate lines and a plurality of data lines formed to cross each other, and thin film transistors formed at the intersections of the plurality of gate lines and the plurality of data lines. The plurality of gate lines and the plurality of data lines crossing each other define the pixels. The thin film transistors are connected to pixel electrodes each included in the pixels, respectively. On the other hand, the color filter substrate 111 includes: red, green, and blue color filters opposite to the pixels; a black matrix configured to rim each of the color filters; and a common electrode formed to cover the color filters and the black matrix. The black matrix is formed to shield the gate lines, the data lines, and the thin film transistors.

The LCD device further includes a driver printed-circuit-board (PCB) 115 disposed by an edge of the LCD panel 110. The driver PCB 115 applies driving signals to the gate and data lines on the LCD panel 110. To this end, the driver PCB 115 is electrically connected to the LCD panel 110 by means of COFs (chip on films) 117. The COFs 117 can be replaced with tape carrier packages (TCPs).

The backlight unit 120 disposed under the LCD panel 110 includes a box-shaped bottom cover 170 with an opened upper surface, a light source package 150 disposed at an inner side of the bottom cover 170, and a light guide plate 140 configured to convert spotted lights emitted from the light source package 150 into two-dimensional light. The backlight unit 120 further includes a reflection sheet 160 disposed under the light guide plate 140 and configure to reflect light progressing downwardly from the light guide plate 140 toward the LCD panel 110, and optical sheets 130 disposed over the light guide plate 140 and configured to scatter and converge incident light from the light guide plate 140.

Although it is not shown in the drawings, the backlight unit 120 still further includes a support main formed from a mold material in a rectangular rim shape. The support main is configured to receive the light source package 150, light guide plate 140, optical sheets 130, and reflection sheet 160. Also, the support main is combined with the bottom cover 170.

The optical sheet 130 includes a diffusion sheet, a converging sheet, and a protective sheet. The diffusion sheet is configured to scatter light. The converging sheet is configured to converge the scattered light. The protective sheet is used to protect a converging pattern formed on the converging sheet.

The light source package 150 includes a PCB 151 and a plurality of LEDs 153 loaded on the PCB 151 at a fixed interval. The PCB 151 is configured to prevent defects which can be caused by heat generated in the LEDs 153. To this end, the PCB 151 is formed from a superior thermal conductivity metal material suitable to rapidly radiate heat.

The light guide plate 140 is formed from poly methyl methacrylate. Although it is not shown in detail in the drawings, the light guide plate 140 is formed in a wedge shape which becomes thinner the further away it goes from a light incident surface facing the light source package 150.

One side portion of the light guide plate 140 adjacent to the light source package 150 is formed in a structure suitable to mix incident lights from the light source package 150.

More specifically, the light guide plate 140 includes one side portion provided with an undercut space 141 enough to accommodate the light source package 150 (more specifically, the LEDs 153). The undercut space 141 is formed by undercutting the side portion of the light guide plate 140 in a stair shape. The undercut space 141 is formed to extend along the side portion from another side surface meeting therewith to the other opposite side surface.

The light guide plate 140 further includes first and second rounded reflection surfaces 143 and 145 formed on its upper surface edge opposite to the undercut space 141 and configured to primarily reflect lights from the light source package 150. The first rounded reflection surface 143 is formed to have a symmetrical curvature to the second rounded reflection surface 145. As such, a boundary line between the first and second rounded reflection surfaces 143 and 145 is opposite a longitudinal center line of the radiation surface of the light source package 150 (more specifically, a longitudinal center axis of LED array). The first rounded reflection surface 143 primarily reflects light from the light source package 150 in an outward direction (or toward one side surface) of the light guide plate 140. On the contrary, the second rounded reflection surface 145 primarily reflects light from the light source package 150 in an inward direction (or toward the other opposite side surface) of the light guide plate 140, so that the inwardly reflected light is converted into two-dimensional light.

The side portion of the light guide plate 140 still further includes an inclined surface 147 formed to slope downwardly from its side surface and configured to secondarily reflect the primarily reflected light from the first rounded reflection surface 143. The inclined surface 147 secondarily reflects the primarily reflected light from the first rounded reflection surface 143 in the inward direction (or toward the other opposite side surface) of the light guide plate 140. Such an inclined surface 147 together with the first and second rounded reflection surfaces 143 and 145 is formed in a single body united with the light guide plate 140 when the light guide plate 140 is manufactured.

Furthermore, a reflective material can be coated on the first and second rounded reflection surfaces 143 and 145, or a reflection sheet can be attached to the first and second rounded reflection surface 143 and 145, even though they are not shown in the drawings. Similarly, the reflective material can be coated on the side surface of the light guide plate including the inclined surface 147, or another reflection sheet can be attached to the side surface of the light guide plate 140 including the inclined surface 147.

In this manner, the light guide plate 140 according to an embodiment of the present disclosure is formed to include the first and second rounded reflection surfaces 143 and 145 and the inclined surface 147 configured to primarily or secondarily reflect light emitted from the LEDs 153 which is disposed under it. As such, brightness in the region on which the LEDs 153 are arranged can be made uniform.

Moreover, one side portion of the light guide plate 140 according to this disclosure is undercut in a single stair shape and provided with the undercut space 141 enough to accommodate the LEDs 153. As such, the backlight unit is not limited to the size of the LED 153 (or the light source package 150). Therefore, the non-display area corresponding to the edges of the LCD device can be reduced below the limitation caused by the LEDs 153 (or the light source package 150). Also, the external appearance quality of the LCD device can be improved.

Figure 4:
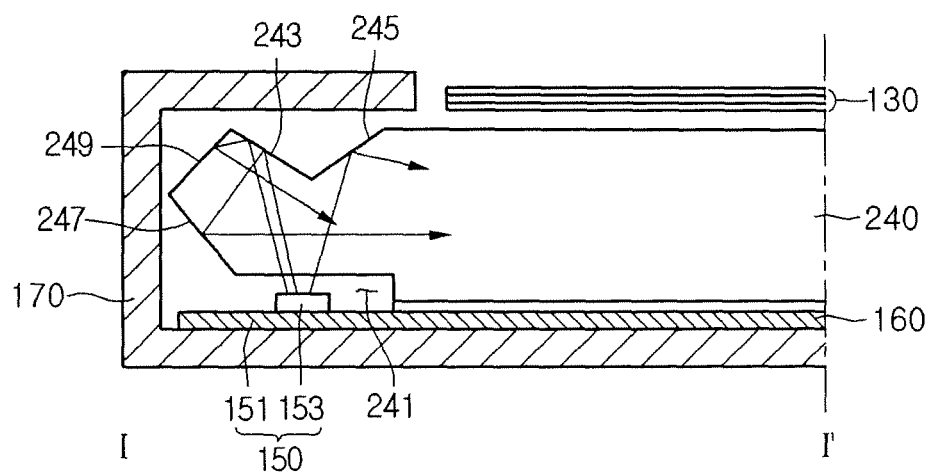
FIG. 4 is a cross-sectional view showing an LCD device according to another embodiment of the present disclosure.

FIG. 4 is a cross-sectional view showing a backlight unit according to another embodiment of the present disclosure. As shown in FIG. 4, the backlight unit of another embodiment is configured in the same manner as that of the first embodiment, without a light guide plate 240. The components of another embodiment of the same configuration as those of the first embodiment will be referred to by the same reference numbers and names. Also, the description of another embodiment overlapping with the first embodiment will be omitted.

According to another embodiment of the present disclosure, a light guide plate 240 includes one side portion provided with an undercut space 241 enough to accommodate the light source package 150 with the LEDs 153. The undercut space 241 is formed by undercutting the side portion of the light guide plate 240 in a single stair shape. The undercut space 241 is formed to extend along the side portion from another side surface meeting therewith to the other opposite side surface.

The light guide plate 240 further includes first and second inclined surfaces 243 and 245 formed on its upper surface edge opposite to the undercut space 241 and configured to primarily reflect lights from the LEDs 153 within the light source package 150. The first inclined surface 243 is formed to have a symmetrical inclination with respect to the second inclined surface 245. As such, a boundary line between the first and second inclined surfaces 243 and 254 is opposite a longitudinal center line of the radiation surface of the light source package 150 (more specifically, a longitudinal center axis of LED array). The first inclined surface 243 primarily reflects lights from the LEDs 153 within the light source package 150 in an outward direction (or toward one side surface) of the light guide plate 240. On the contrary, the second inclined surface 245 primarily reflects lights from the LEDs 153 within the light source package 150 in an inward direction (or toward the other opposite side surface) of the light guide plate 240, so that the inwardly reflected light is converted into two-dimensional light.

The side portion of the light guide plate 240 still further includes third and fourth inclined surfaces 247 and 249 configured to secondarily reflect the primarily reflected lights from the first inclined surface 243. The third and fourth inclined surfaces 247 and 249 secondarily reflect the primarily reflected lights from the first inclined surface 243 in the inward direction (or toward the other opposite side surface) of the light guide plate 240. The third inclined surface 247 is formed to have a symmetrical inclination in respect to the fourth inclined surface 249. As such, a boundary line between the third and fourth inclined surfaces 247 and 249 is configured to outwardly protrude from the side surface of the light guide plate 240. Such first through fourth inclined surfaces 243, 245, 247, and 249 are formed in a single body united with the light guide plate 240 when the light guide plate 240 is manufactured.

Although they are not shown in the drawing, a reflective material can be coated on all first through fourth inclined surfaces 243, 245, 247, and 249. Alternatively, a reflection sheet can be attached to all the first through fourth inclined surfaces 243, 245, 247, and 249.

As described above, the light guide plate 240 according to another embodiment of the present disclosure is formed to include the first through second inclined surfaces 243, 245, 247, and 249 configured to primarily or secondarily reflect light emitted from the LEDs 153 which is disposed under it. Therefore, brightness in the region on which the LEDs 153 are arranged can be made uniform.

Furthermore, one side portion of the light guide plate 240 according to another embodiment is undercut in a single stair shape and provided with the undercut space enough to accommodate the LEDs 153. As such, the backlight unit is not limited to the size of the LED 153. Therefore, the non-display area corresponding to the edges of the LCD device can be reduced below the limitation caused by the LEDs 153. Also, the external appearance quality of the LCD device can be improved.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A backlight unit comprising:
   a light source; and
   a light guide plate configured to primarily and secondarily reflect light from the light source and to convert the reflected light into two dimensional light,
   wherein one side portion of the light guide plate is formed to provide an undercut space enough to accommodate the light source, wherein the light guide plate includes first and second rounded reflection surfaces formed on an upper surface of the side portion and configured to primarily reflect light emitted from the light source, wherein the light guide plate further includes an inclined surface formed on a side surface of the side portion and configured to reflect the primarily reflected light from the first rounded reflection surface toward the other opposite side of the light guide plate, and wherein inclined surface is formed on a side surface of light guide plate.

2. The backlight unit claimed as claim 1, wherein the first rounded reflection surface is formed in a symmetrical curvature with respect to the second rounded reflection surface.

3. The backlight unit claimed as claim 1, wherein a boundary portion between the first and second rounded reflection surfaces is opposite the center axis of the light source.

4. The backlight unit claimed as claim 1, wherein the primarily reflected light from the second rounded reflection surface processes toward the other opposite side of the light guide plate.

5. A backlight unit comprising:
a light source; and
a light guide plate configured to primarily and secondarily reflect light from the light source and to convert the reflected light into two dimensional light,
wherein one side portion of the light guide plate is formed to provide an undercut space enough to accommodate the light source,
wherein the light guide plate includes first and second inclined surfaces formed on an upper surface of the side portion and configured to primarily reflect light emitted from the light source,
wherein the light guide plate further includes third and fourth inclined surfaces formed on a side surface of the side portion and configured to secondarily reflect the primarily reflected light from the first inclined surface toward the other opposite side of the light guide plate,
wherein third and fourth inclined surface is formed on a side surface of light guide plate.

6. The backlight unit claimed as claim 5, wherein the first inclined surface is symmetrically formed with respect to the second inclined surface.

7. The backlight unit claimed as claim 5, wherein a boundary portion between the first and second inclined surfaces is opposite the center axis of the light source.

8. The backlight unit claimed as claim 5, wherein the primarily reflected light from the second inclined surface processes toward the other opposite side of the light guide plate.

9. The backlight unit claimed as claim 5, wherein the third inclined surface is symmetrically formed with respect to the second inclined surface.

10. The backlight unit claimed as claim 5, wherein a boundary portion between the third and fourth inclined surfaces is configured to outwardly protrude from the side portion of the light guide plate.

11. A liquid crystal display device comprising:
a liquid crystal display panel;
a light source disposed by one under side of the liquid crystal display panel; and
a light guide plate configured to primarily and secondarily reflect light from the light source and to convert the reflected light into two dimensional light,
wherein one side portion of the light guide plate is formed to provide an undercut space enough to accommodate the light source,
wherein the light guide plate includes first and second rounded reflection surfaces formed on an upper surface of the side portion and configured to primarily reflect light emitted from the light source,
wherein the light guide plate further includes an inclined surface formed on a side surface of the side portion and configured to reflect the primarily reflected light from the first rounded reflection surface toward the other opposite side of the light guide plate, and
wherein the inclined surface is formed on a side surface of light guide plate.

12. The liquid crystal display device claimed as claim 11, wherein the first rounded reflection surface is formed in a symmetrical curvature with respect to the second rounded reflection surface.

13. A liquid crystal display device comprising:
a liquid crystal display panel;
a light source disposed by one under side of the liquid crystal display panel; and
a light guide plate configured to primarily and secondarily reflect light from the light source and to convert the reflected light into two dimensional light,
wherein one side portion of the light guide plate is formed to provide an undercut space enough to accommodate the light source,
wherein the light guide plate includes first and second inclined surfaces formed on an upper surface of the side portion and configured to primarily reflect light emitted from the light source,
wherein the light guide plate further includes third and fourth inclined surfaces formed on a side surface of the side portion and configured to secondarily reflect the primarily reflected light from the first inclined surface toward the other opposite side of the light guide plate,
wherein third and fourth inclined surface is formed on a side surface of light guide plate.

14. The liquid crystal display device claimed as claim 13, wherein the first inclined surface is symmetrically formed with respect to the second inclined surface.

* * * * *